Dec. 5, 1950        L. R. WILLIAMSON        2,533,077

GEAR REDUCTION MECHANISM FOR PRESS BRAKES

Filed Oct. 15, 1947        3 Sheets-Sheet 1

INVENTOR.
LARKIN R. WILLIAMSON

BY *Fay, Golrick & Fay*

ATTORNEYS

Dec. 5, 1950        L. R. WILLIAMSON        2,533,077
GEAR REDUCTION MECHANISM FOR PRESS BRAKES
Filed Oct. 15, 1947        3 Sheets-Sheet 2
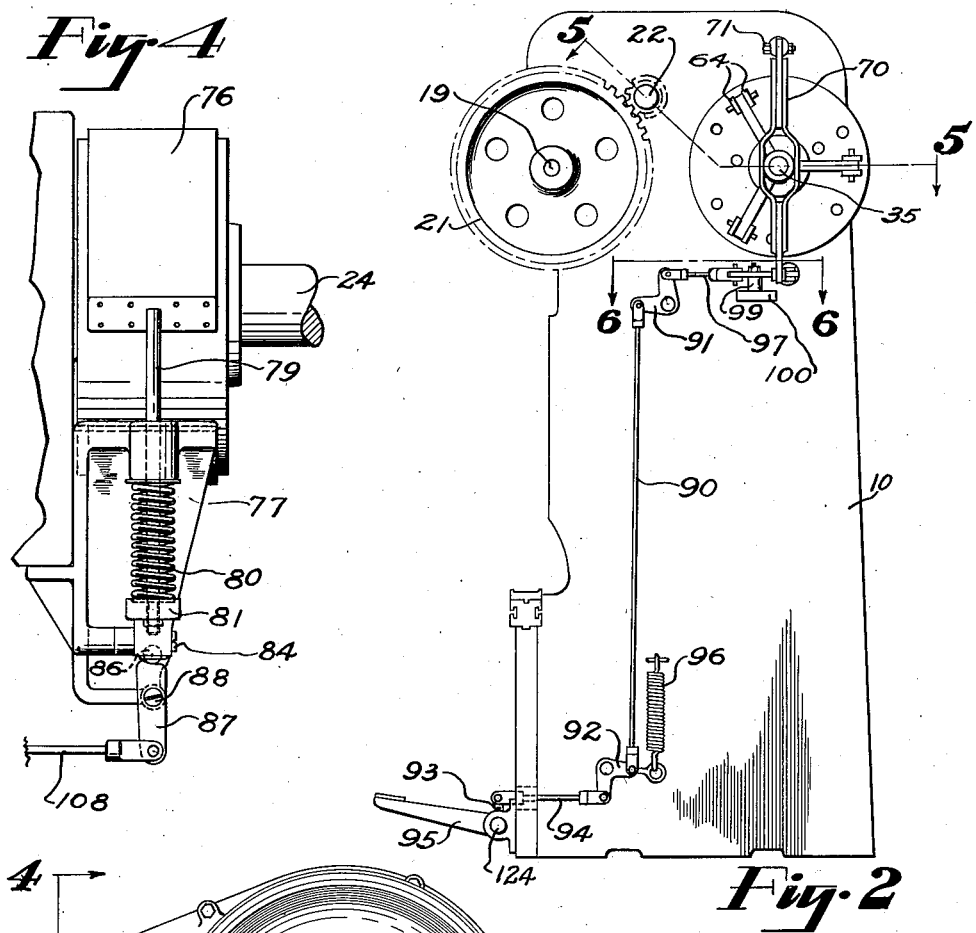
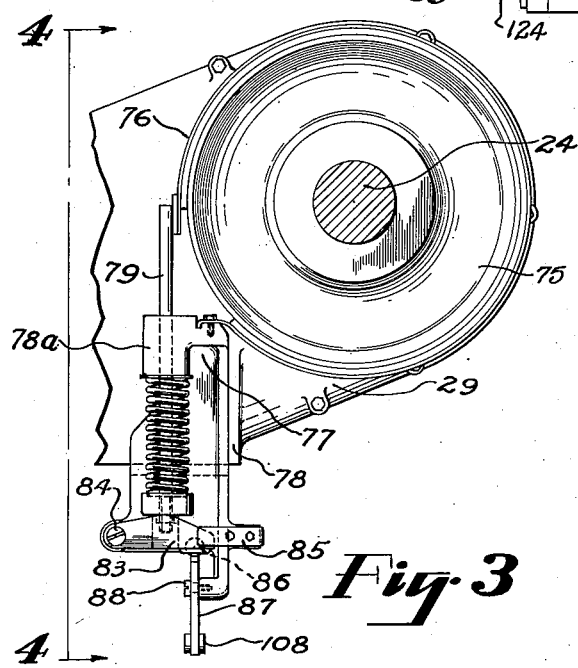
INVENTOR.
LARKIN R. WILLIAMSON
BY Fay, Golrick & Fay
ATTORNEYS Dec. 5, 1950   L. R. WILLIAMSON   2,533,077
GEAR REDUCTION MECHANISM FOR PRESS BRAKES
Filed Oct. 15, 1947   3 Sheets-Sheet 3
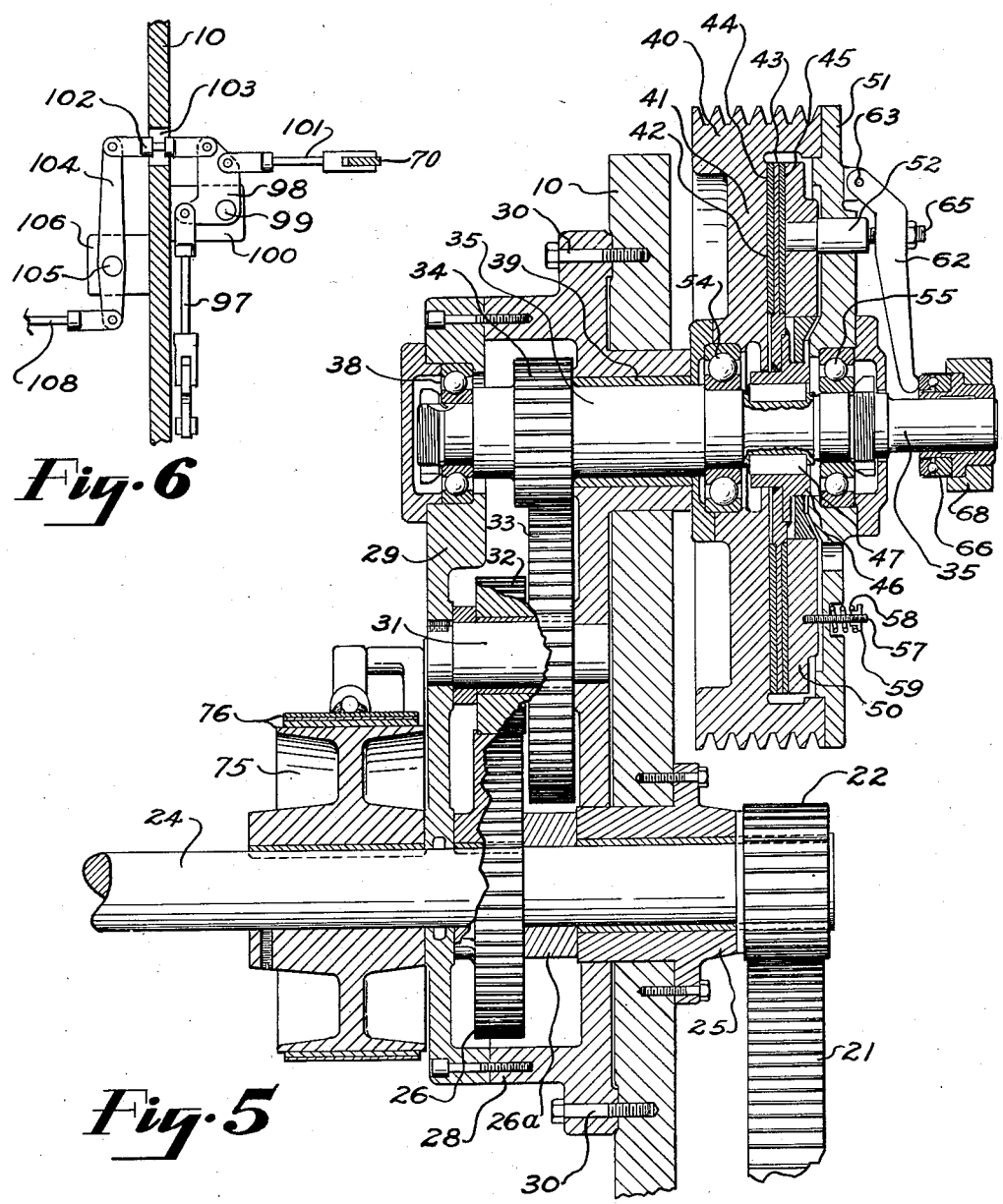
INVENTOR.
LARKIN R. WILLIAMSON
BY Fay, Golrick & Fay
ATTORNEYS Patented Dec. 5, 1950

2,533,077

UNITED STATES PATENT OFFICE 2,533,077

GEAR REDUCTION MECHANISM FOR PRESS BRAKES

Larkin R. Williamson, Montclair, N. J.

Application October 15, 1947, Serial No. 780,062

1 Claim. (Cl. 74—392)

This invention is directed to improvements in press brakes and has for the general object thereof the provision of a press driving and control mechanism arranged in such manner that the press slide or ram is under sensitive control of the operator during any and all periods of operation of the ram or slide of the press.

More specifically my invention is concerned with the provision of an interconnected clutch and a brake mechanism which are opened and closed respectively when the operator relaxes manual effort to maintain the press slide in operation and whereby the movement of the press slide or ram is arrested immediately upon the recession of such manual effort.

A further object of the invention is the provision of dual braking means for action on a back shaft of the press, one of the braking mechanisms comprising a major braking means coordinated with the mechanism for operating the clutch whereby the major braking means is closed and released in accordance with the opening and closing of the clutch respectively while the second braking means is in the form of a constantly closed friction brake mechanism that can be manually adjusted to refine the braking action and act as a dampening influence on the inertia of the heavy moving parts of the press.

A still further object of the invention is the provision of a gear reduction mechanism which is adaptable for the driving of the back shaft of a press brake wherein the major frame parts such as the end frame members comprise thick rolled steel plates and the transmission mechanism is carried by one of the plates.

Other objects and advantages of the invention will be apparent during the course of the following detailed description of preferred forms of the invention, reference being made to the accompanying drawings wherein:

Fig. 2 is an end elevation of the press;

Fig. 3 is an enlarged side elevation of the major friction brake mechanism of the press;

Fig. 4 is a front elevation of the friction brake mechanism shown in Fig. 3 as viewed from a plane indicated by the line 4—4 of Fig. 3;

Fig. 5 is an enlarged cross-sectional view taken through the transmission mechanism of the press along the line 5—5 of Fig. 2;

Fig. 6 is a detailed plan view of part of the clutch and main brake operating mechanism taken substantially along the line 6—6 of Fig. 2.

Figure 1:
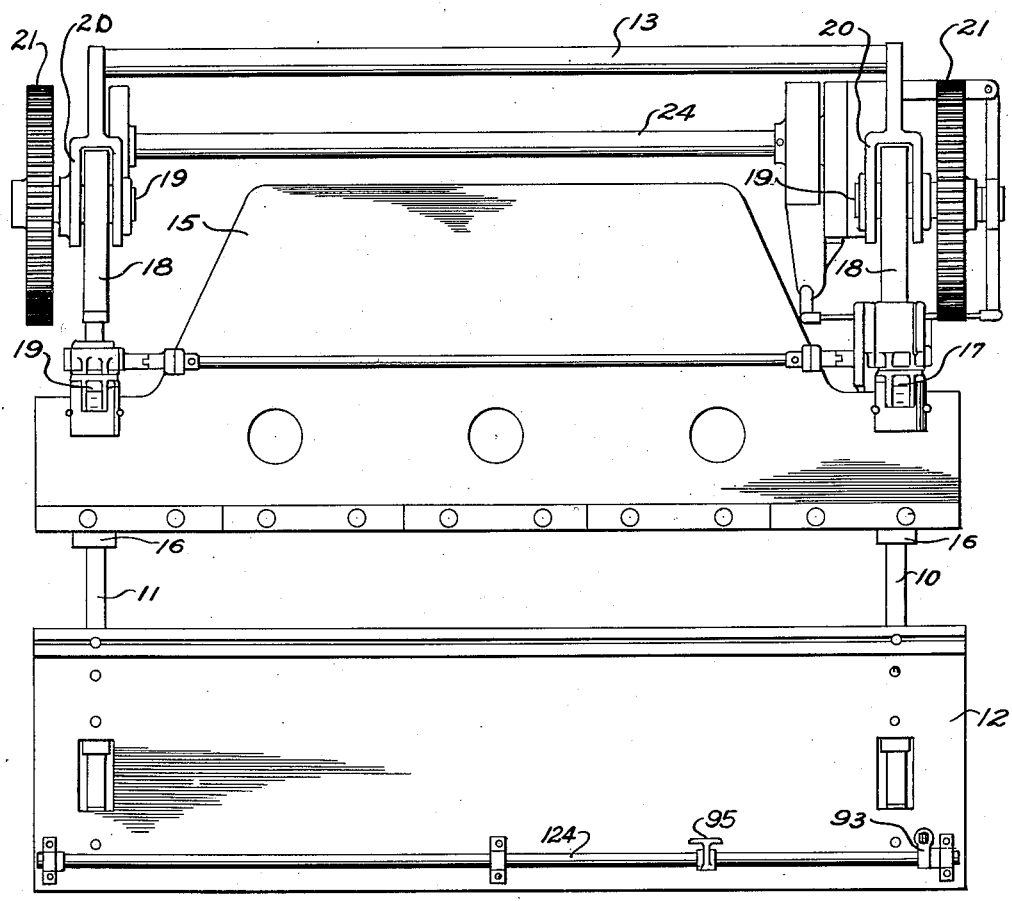
Fig. 1 is a front elevation of a press brake wherein the major frame parts such as the end plates and bed as well as the slide are formed from heavy rolled steel plates.

Press brakes of the general utility power driven type usually have a slide or ram of beam construction and operated by a pair of crank or toggle mechanisms associated with the end frame structures of the press. Various clutch and brake mechanisms have been used which were alternatively effective in an automatic manner in driving the ram through a complete cycle of bending or forming operation and thereafter arresting the movement of the ram. Also various means were provided for obtaining an "inching" movement of the ram when dies were being set during a change in the production job.

The general type of work run through a press brake generally is bulky and awkward in handling and frequently requires more than one operator or a helper workman to position the work between the dies and accurately against the gauges in order to avoid defective work and to facilitate production. Once the clutch control is tripped to driving engagement the press ram completes its forming or bending or piercing stroke and retracts without being under the control of the operator. In the present invention I have arranged the driving control of the press in such manner that the clutch and the friction brake are under the control of the operator at all times during actuation of the ram or slide of the press so that the ram movement is arrested immediately upon the cessation of foot pressure of the operator upon a pedal comprising part of the clutch control.

Referring to the drawings, I show a press brake structure comprising right and left end frame members 10 and 11 connected across the lower front thereof by a bed plate 12. The top regions of the end plates are connected by heavy cross bars 13 bolted or otherwise secured to the end plates. A ram or slide 15 is mounted for vertical reciprocation in slide mechanisms 16 connected to the back of the ram plate and the front edges of the end plates 10—11, the bed plate 12 and the ram plate 15 are formed of heavy rolled steel slabs from 2½ inches to 4 inches in thickness and the thickness is determined by the size and capacity of the press.

The ram or slide is driven by a pair of crank operated connecting rods which are suitably connected by ball joint mechanisms 17 to the ram. The upper ends of the connecting rods are connected to cranks or cams mounted on crank shafts 19 and the crank shafts are supported in yoke shaped bearing structures 20 welded to the end plates 10 and 11. The crank shafts 19 have bull gears mounted on the outer ends thereof and these bull gears are driven in unison by pinions 22 mounted on a back shaft 24 supported by bearing structures 25 secured in aligned openings formed in the end plates 10 and 11. Acting on the back shaft 24 are two independent friction brake mechanisms and a speed reduction gear transmission having certain novel features which will be described hereinafter.

The back shaft 24 is driven by a transmission gear 26 which is keyed thereto and which is disposed within a gear box structure comprising a base casting 28 secured to the inside face of the end plate 10 and a bearing and closure part 29. Suitably supported within the gear box structure is a fixed stud shaft 31 which supports compound gearing comprising a pinion portion 32 drivingly meshing with the back shaft gear 26 and a gear portion 33. The gear portion 33 is driven by a pinion 34 comprising part of or mounted upon a clutch shaft 35. The clutch shaft 35 is carried by the gear box structure, there being a bearing mechanism 38 for the inner end of the clutch shaft and which is supported by the cover part of the gear box structure. A long plain bearing structure is integrally formed to extend from the gear box structure outwardly through a suitable opening formed in the end plate 10 to terminate adjacent to a bearing mounting on the clutch shaft 35 for a clutch flywheel 40. The flywheel 40 has the rim thereof provided with belt grooves and the radial solid web 41 thereof with a disk clutch face 42. A clutch disk 43 is welded to a hub structure 46 which is spline connected to the clutch shaft 35 by keys 47. Friction disks 44 and 45 are secured to the clutch disk 43 on opposite faces thereof. A normally open clutch pressure shoe 50 is supported by operating pins 52 which extend through openings formed in a closure or radius plate 51 which is secured to and comprises a rotating part of the flywheel. Bearing mechanisms 54 and 55 rotatably support the flywheel and radius plate 51 on the clutch shaft 35.

It will be obvious that axial shifting of the clutch shoe 50 toward the left in Fig. 5 will cause the shoe, clutch disk and flywheel web 41 to be pressed together thereby to cause the flywheel to drive clutch shaft 35. To maintain the clutch mechanism normally open threaded studs 57 are secured to the brake shoe 50 and extend through openings formed in the radius plate 51. Nut members 59 on the studs serve to hold springs 58 in compressed relation to the radius plate.

To operate the shoe pins 52 lever members 62 are pivotally connected by pins 63 to pairs of bosses 64 formed on the outer side of the radius plate. Adjustable screw members 65 are carried by the levers to contact the ends of the shoe pins 52. The levers 62 are radially disposed and the inner free ends terminate adjacent the clutch shaft and bear against a thrust bearing 66 comprising part of a shipper collar 68 slidably mounted on the outer end of the clutch shaft. A non-rotating lever structure 70 is pivotally connected to the upper part of the end plate 10 at 71 (Fig. 2) and is in the form of a yoke spanning the collar 68 and with the lower end thereof extending below the perimeter of the flywheel structure to afford connection to a link and lever mechanism which also operates the main brake mechanism.

The main brake mechanism comprises a brake drum 75 key connected to the back shaft 24 at a position immediately adjacent the gear box structure 29—28 (see Figs. 4 and 5). A brake band structure 76 circumscribes the drum and has one end thereof anchored or attached to a bracket 77 which is attached to a vertically disposed flange 78 formed on the gear box part or closure 29 (see Figs. 3 and 4). The free end of the brake band structure is attached to an operating rod 79 which extends downwardly through a bearing boss 78a formed on bracket 77 a substantial distance to pass centrally through a brake operating spring 80 held in thrust relation to the boss 78a and the operating rod by a collar 81 adjustably attached to the lower end of the rod. The collar 81 rests upon a wide lever 83 and this lever is pivotally attached to the bracket structure 77 by a screw pin 84. The central part of the lever is provided with a bored cavity into which the lower threaded end of the rod 79 and an adjusting nut thereon may extend and also be accessible for adjustment of collar 81 and spring 80. The outer end of lever 83 is disposed between stabilizer plates 85 mounted on bracket 77 and this outer end has a ball contact 86 with a camming lever 87 swingable in a plane at right angles to the plane of movement of lever 84. Lever 87 is pivotally supported by a screw pin 88 secured to a dependent portion of bracket 77. When camming lever 88 is swung clockwise as viewed in Fig. 4, the upper camming end thereof raises the brake band rod 79 and effects further compression of spring 80. The brake action is thus released. Swinging the camming lever 87 counterclockwise permits the spring 80 to draw the rod downwardly and effect the braking action.

The interconnecting means for causing the brake to be released when the clutch is forced into driving engagement comprises a vertically extending rod 90 connected to an upper bell crank lever 91 and a lower bell crank lever 92; both levers being pivotally supported on stud pins attached to the frame end plate 10 (see Fig. 2). Lever 92 is connected to a rocker lever 93 by linkage 94 which extends through an opening formed in the lower part of the bed plate 12. Lever 93 is attached to a rocker shaft 124 extending along the lower front face of the bed plate. A pedal lever 95 may be positioned anywhere across the front of the press to meet the operator's convenience. A spring member 96 attached to one of the arms of lever 92 serves to maintain the pedal lever 95 in an upwardly swung position and also maintains the bell crank lever 91 swung in a clockwise direction.

For operating the clutch lever 70 a linkage 97 is connected to a bell crank plate lever 98 pivoted on a stud screw 99 supported by a lug 100 attached to the outer face of end plate 10. Lever 98 which swings on a horizontal plane has an arm thereof connected to the lower end of the clutch operating lever 70 by linkage 101. It will be seen that both the spring 96 and springs 58 all tend to maintain the clutch lever 70 swung to a clutch release position when the operator has removed his foot from pedal 95.

An interconnecting linkage and lever mechanism extends between the bell crank lever 98 and the brake releasing lever 87. This connection comprises linkage 102 connected to the same arm of the lever 98 as the clutch lever linkage 101. Linkage 102 is pivotally connected to one end of a lever member 104 which is pivotally mounted on a screw stud 105 supported by a lug 106 secured to the inside face of the frame end plate 10. The opposite end of lever 104 is connected to a linkage 108 which is connected to the lower end of the brake releasing lever 87. It will be noted that when linkage 101 is drawn to the left as viewed in Fig. 6 to cause the clutch lever to close the clutch, linkage 108 is shifted to the right and as shown in Fig. 4 to the left thus releasing the brake mechanism.

Figure 7:
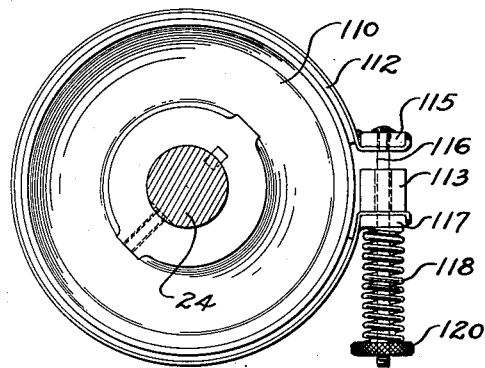
Fig. 7 is a cross-sectional view taken through the back shaft and looking toward the auxiliary brake mechanism.

The secondary or auxiliary friction brake mechanism is associated with the back shaft 24 and the end plate 11. This mechanism is arranged so that a braking action is always being exerted upon the back shaft even when the brake band 76 of the main brake is inactive, i. e., when the clutch mechanism is driving the back shaft 24. The purpose of this arrangement is to provide a refined control over the inertia forces of the moving parts of the press brake when precision work is being performed on the machine and this auxiliary braking means is such as to be manually adjusted to the refined braking action required for each particular precision job being performed. For example it may be desired to hold the work between the anvil die or dies and the die on the slide while certain other work is performed on the work piece such as the shaping of a right angled flange on the work piece while being held in the press. The operator can adjust the auxiliary brake mechanism without disturbing the main brake mechanism adjustment, the latter being related to the opening and closing action of the clutch mechanism. Hence, in operation, the arresting of the die slide at the bottom of its stroke can be accomplished more readily by the operator. The foregoing is only one instance where the availability of the auxiliary brake means is of distinct advantage. The form of the auxiliary braking means may comprise simply a brake drum 110 keyed to the back shaft 24 at a position immediately adjacent the inside face of the end frame plate member 11 (see Fig. 7). A brake band means 112 similar to the brake band means 76 has one end thereof fixed to a member 117 which a spring 118 thrusts against a stud member 113 which is fixed to the end plate 11. The free end of the brake band 112 is attached to the head 115 of a brake band operating rod 116 which passes through the stud 113, the member 117 and the spring 118. The lower end of the rod 116 is threaded to engage a manually adjustable wheel or nut 120 and upon which the lower end of the spring 118 seats. When the operator lowers the nut or wheel 120 the spring is permitted to expand and the brake action is decreased. Tightening the nut increases the braking action.

It will be noted that the design of the transmission housing 28—29 is quite rugged since the main brake mechanism is suspended therefrom and that a number of bolts 30 secure the transmission unit to the end frame plate 10. It also will be noted the design is such that the end plate 10 may vary in thickness without necessitating cut and try assembly of the transmission unit, there being a single spacing collar 26a which may vary in thickness with variation in thickness of the end plate 10. Likewise it is to be seen that adequate space may be provided between the clutch flywheel 40 and the outer face of the end plate for the same purpose while maintaining the desired length of the plain bearing 39. The advantage of the arrangement is that the rolling mill producing the heavy end plates need not be held to close tolerances on the thickness of the steel slabs and overall face machining of the plates is avoided. Further, deliberate increase of say an inch in the slab thickness for a heavier duty press frame would not involve a redesign of the transmission unit.

The only period in which the back shaft 24 is driven is that period in which the operator maintains the pedal lever depressed since the clutch can remain closed only as long as this manual effort is exerted. Release of the pedal lever brings about the application of the force of the brake spring to the brake band 76 but during the time lag between clutch release and brake application the secondary brake mechanism is active in decreasing the inertia influences of the rotating bull gears, back shaft and transmission gears. Hence there is no interval during which inertia influences are free from a braking action. While a slight disadvantage in extra power requirement is present to meet the constantly applied secondary brake effort the advantage of sensitive control outweighs it.

I claim:

In a powered press brake, an upright plate forming one end of the frame of the press; a tubular bearing mounted in an opening in said plate and attached at one end to one face of the plate, the opposite end of the bearing being adapted to extend beyond the opposite face of the plate; a drive shaft journalled in said bearing; a gear housing attached to said opposite face of the plate, the housing having aligned openings through which the drive shaft extends, one of said openings being adapted to telescopingly receive said opposite end of said bearing whereby the thickness of the plate may appreciably vary within limits without disconnection from said housing; a gear keyed to said drive shaft and enclosed by said housing, said housing having an elongated journal projecting from the side thereof confronting the plate and adapted to extend through an opening in said plate and beyond said one face of the latter whereby the thickness of the plate may vary within limits without interference with the outer end of the elongated journal; a clutch shaft journalled at one end in the housing and extending through said elongated journal; a pinion gear on said clutch shaft; and reduction gearing journalled in said housing and meshing with the gear on the drive shaft and the pinion gear on the clutch shaft.

LARKIN R. WILLIAMSON.

REFERENCES CITED

The following references are of record in the file of this patent:

UNITED STATES PATENTS

| Number | Name | Date |
| --- | --- | --- |
| 1,162,573 | Conklin | Nov. 30, 1915 |
| 1,618,825 | Hazelton | Feb. 22, 1927 |
| 1,699,585 | Dreis | Dec. 11, 1928 |
| 1,708,344 | Winkler | Apr. 9, 1929 |
| 2,136,856 | Long | Nov. 15, 1938 |
| 2,237,170 | Williamson | Apr. 1, 1941 |